United States Patent
Handshaw et al.

(10) Patent No.: US 11,562,162 B1
(45) Date of Patent: Jan. 24, 2023

(54) BARCODE READER WITH TRANSFLECTIVE MIRROR

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US); Dariusz J. Madej, Shoreham, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/463,181

(22) Filed: Aug. 31, 2021

(51) Int. Cl.
  *G06K 7/10* (2006.01)
  *G06K 7/14* (2006.01)

(52) U.S. Cl.
  CPC ....... *G06K 7/10831* (2013.01); *G06K 7/1413* (2013.01)

(58) Field of Classification Search
  CPC ............. G06K 7/10831; G06K 7/1413; G06K 7/10702; G06K 7/10554; G06K 7/10564; G06K 7/10594; G06K 7/10613; G06K 7/10633; G06K 7/10673

USPC ........................................ 235/462.35, 462.33
See application file for complete search history.

(56) References Cited

U.S. PATENT DOCUMENTS

| | | | | |
|---|---|---|---|---|
| 10,592,712 B2* | 3/2020 | Suman | ............... | G06K 7/10841 |
| 2012/0212662 A1* | 8/2012 | Shimoda | .................. | G02B 7/28 |
| | | | | 348/E5.045 |
| 2013/0320087 A1* | 12/2013 | Moran | .................... | G06K 19/18 |
| | | | | 235/440 |
| 2014/0183263 A1* | 7/2014 | Chen | .................. | G06K 7/10752 |
| | | | | 235/440 |
| 2019/0171855 A1* | 6/2019 | Suman | ............... | G06K 7/10722 |

* cited by examiner

*Primary Examiner* — Edwyn Labaze
(74) *Attorney, Agent, or Firm* — Yuri Astvatsaturov

(57) ABSTRACT

Barcode readers with transflective mirrors are disclosed herein. An example barcode reader includes a housing and a window positioned within the housing, an imaging sensor and second imaging sensor positioned within the housing, and a transflective mirror positioned within the housing and in a path of a field-of-view of the imaging sensor. The field-of-view of the imaging sensor passes through the transflective mirror and out the window with the transflective mirror in a transmissive state and the field-of-view of the second imaging sensor is reflected off of the transflective mirror and out the window with the transflective mirror in a reflective state.

18 Claims, 6 Drawing Sheets

BARCODE READER WITH TRANSFLECTIVE MIRROR

BACKGROUND

Typical barcode readers, such as handheld barcode readers, direct part marking scanners, and bioptic barcode readers, that have multiple image sensors or cameras that are directed out of a common window require that the image sensors are aligned with different lines of sight, which creates parallax, or a displacement or difference in an apparent position of an object along the two different lines of sight. It would be beneficial if barcode readers having multiple image sensors or cameras could direct the fields-of-view of the image sensors out of a common window coaxially along a common central axis to avoid parallax. This could allow the images captured from the multiple image sensors to be overlaid and/or compared directly.

SUMMARY

In an embodiment, the present invention is a barcode reader comprising a housing and a window positioned in the housing, a first imaging sensor and second imaging sensor positioned within the housing, and a transflective mirror positioned within the housing and in a path of a first field-of-view of the first imaging sensor. The first field-of-view of the first imaging sensor passes through the transflective mirror and out the window with the transflective mirror in a transmissive state and a second field-of-view of the second imaging sensor is reflected off of the transflective mirror and out the window with the transflective mirror in a reflective state.

In a variation of this embodiment, the first field-of-view of the first imaging sensor passes through the transflective mirror and out the window along a first central axis of the first field-of-view of the first imaging sensor with the transflective mirror in a transmissive state and the second field-of-view of the second imaging sensor is reflected off of the transflective mirror and out the window along a second central axis of the second field-of-view of the second imaging sensor that is coaxial with the first central axis of the first field-of-view of the first imaging sensor with the transflective mirror in a reflective state.

In another embodiment, the present invention is a bioptic barcode reader comprising a housing having horizontal and upright windows, a first imaging sensor and second imaging sensor positioned within the housing, a transflective mirror positioned within the housing and in a path of a first field-of-view of the first imaging sensor, and first and second mirrors positioned within the housing. A first field-of-view of the first imaging sensor is reflected off of the transflective mirror and off of the second mirror and out the upright window along a second central axis with the transflective mirror in a reflective state and a second field-of-view of the second imaging sensor passes through the transflective mirror and reflects off of the second mirror and out the upright window along the second central axis with the transflective mirror in a transmissive state.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
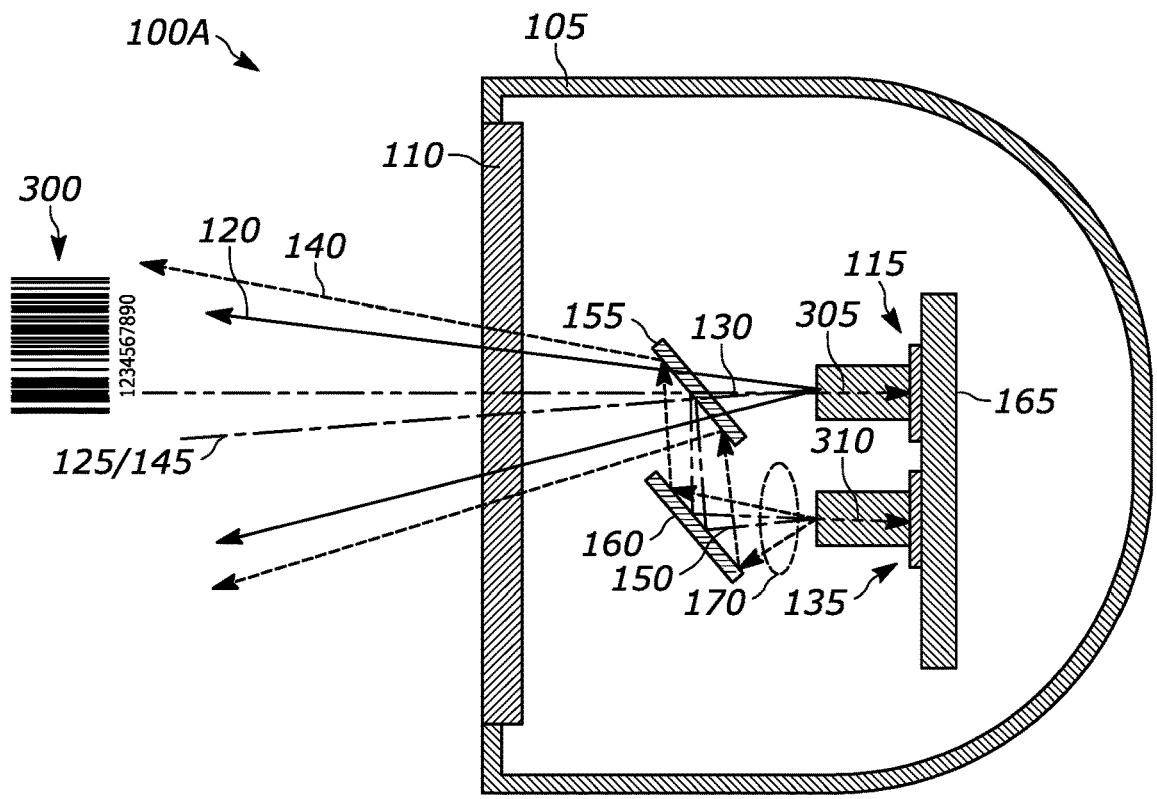
FIG. 1 illustrates a side cross-sectional schematic view of a first example barcode reader having a transflective mirror and two imaging sensors with parallel imaging axes.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Figure 2:
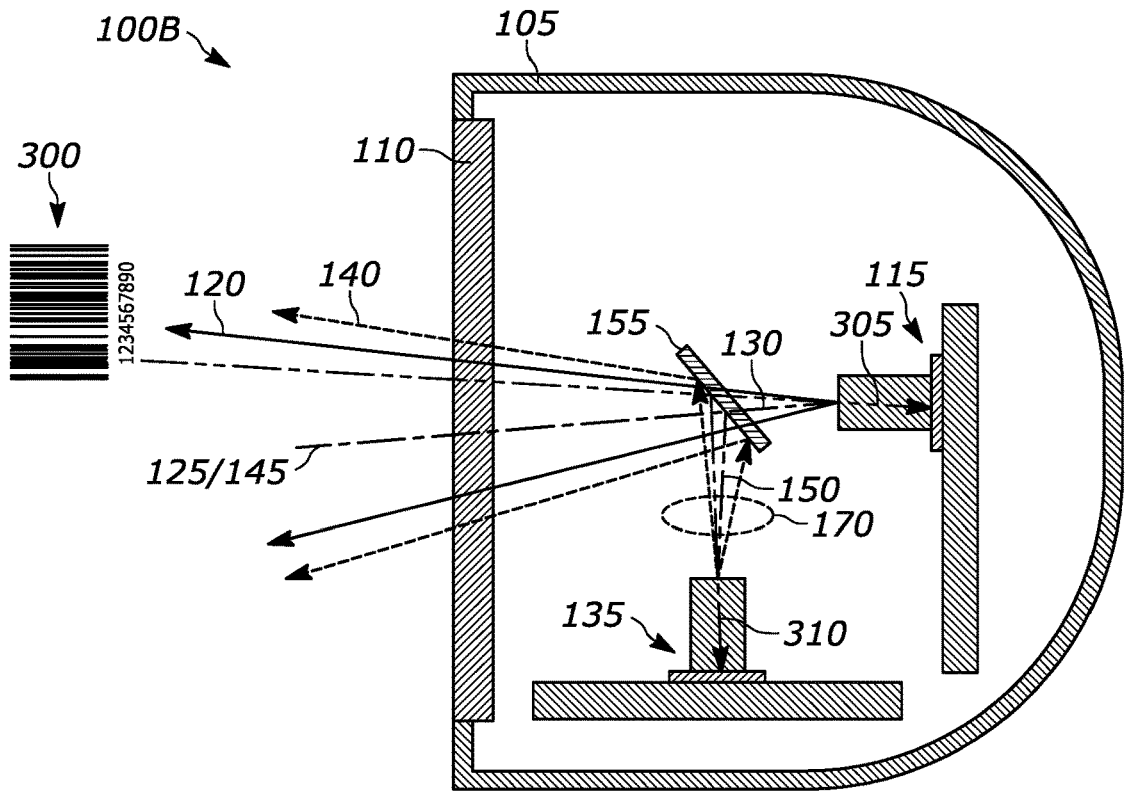
FIG. 2 illustrates a side cross-sectional schematic view of a second example barcode reader having a transflective mirror and two imaging sensors with perpendicular imaging axes.

Referring to FIGS. 1-2, example barcode readers 100A, 100B are shown that use a transflective mirror to direct the entire fields-of-view from two different image sensors out a window along the same central axis so that there is no parallax. In the examples shown, barcode readers 100A, 100B include a housing 105 with a window 110 positioned within housing 105, first imaging sensor 115 and second imaging sensor 135 positioned within housing 105, and a transflective mirror 155, such as the e-TransFlector™ from Kent Optronics, positioned within housing 105 and in a path of the first field-of-view 120 of first imaging sensor 115. First imaging sensor 115 and second imaging sensor 135 can include a cylinder and/or a lens system to assist in directing first field-of-view 120 and second field-of-view 140, if desired. Transflective mirror 155 can be switched between a transmissive state, in which a majority of light is allowed to pass through transflective mirror 155, and a reflective state, in which a majority of light is reflected off of transflective mirror 155. With transflective mirror 155 in the transmissive state, transflective mirror 155 allows first field-of-view 120 of first imaging sensor 115 to pass through transflective mirror 155 and out window 110 along a first central axis 125 of first field-of-view 120 of first imaging sensor 115. In addition, a second field-of-view 140 of second imaging sensor 135 will pass through transflective mirror 155 and is not directed out of window 110. With transflective mirror 155 in the reflective state, transflective mirror 155 reflects second field-of-view 140 of second imaging sensor 135 out of window 110 along a second central axis 145 of second field-of-view 140 of second imaging sensor 135 that is coaxial with first central axis 125 of first field-of-view 120 of first imaging sensor 115. In addition, first field-of-view 120 of first imaging sensor 115 is reflected by transflective mirror 155 and is not directed out of window 110. Optionally, transflective mirror 155 could also be switched to a transflective state, in which transflective mirror 155 is partially reflective and partially transmissive, and transflective mirror 155 would both allow first field-of-view 120 of first imaging sensor 115 to pass through transflective mirror 155 and out of window 110 and reflect second field-of-view 140 of second imaging sensor 135 out of window 110.

In one possible configuration, the switching of transflective mirror 155 between the reflective and transmissive states can be synchronized with the frame rates of first imaging sensor 115 and second imaging sensor 135 such that transflective mirror 155 changes states between the reflective and transmissive states between each image capture of first imaging sensor 115 and second imaging sensor 135. Therefore, with imaging sensors having a frame rate of 120 frames-per-second, there would still be 60 frames-per-second captured by one imaging sensor when transflective mirror 155 is in the transmissive state and 60 frames-per-second captured by the other imaging sensor when transflective mirror 155 is in the reflective state. Alternatively, transflective mirror 155 can be switched between the transmissive and reflective states at any rate and time desired. For example, in a second possible configuration, the switching of transflective mirror 155 between the reflective and transmissive states can be synchronized with the frame rates of first imaging sensor 115 and second imaging sensor 135 such that transflective mirror 155 alternates and changes state between the reflective and transmissive states after two image captures of one imaging sensor and then changes back between the reflective and transmissive states after one image capture of the other imaging sensor.

By switching between first imaging sensor 115 and second imaging sensor 135 and directing first field-of-view 120 of first imaging sensor 115 and second field-of-view 140 of second imaging sensor 135 out of window 110 along coaxial axes, images can be captured by first imaging sensor 115 and second imaging sensor 135 without parallax, which can be useful for various applications. Overlaying images from two imaging sensors can also improve the prediction model accuracy of a CNN-based object identification system, since there would be more data points that a single image sensor could provide.

For example, in one configuration, first field-of-view 120 of first imaging sensor 115 can provide a narrow angle field-of-view and second field-of-view 140 of second imaging sensor 135 can provide a wide angle field-of-view, or vice versa, which would allow barcode readers 100A, 100B to read barcodes that are located both close to a far away from window 110 and enable the use of the same aiming and illumination systems for both first imaging sensor 115 and second imaging sensor 135. In another configuration, second imaging sensor 135 could be a wake up sensor and second field-of-view 140 of second imaging sensor 135 that passes out of window 110 could be the same size or larger than first field-of-view 120 of first imaging sensor 115 that passes out of window 110. When used as a wake up sensor, second imaging sensor 135 would not be used to capture barcodes, but would be used to detect the presence of an object within second field-of-view 140 when the system is not in a decoding state. When second imaging sensor 135 senses and object within second field-of-view 140, the system transitions from the not decoding state to a decoding state and wakes up or activates first imaging sensor 115 to capture barcodes for decoding. In the configuration with second field-of-view 140 being larger than first field-of-view 120, the larger second field-of-view 140 of second imaging sensor 135 (the wake up sensor) would allow second imaging sensor 135 to detect an object and activate the system before the object passes through first field-of-view 120 of first imaging sensor 115. This gives first imaging sensor 115 more time to capture images and potential barcodes on the object, and more image captures, than if the system were not activated until the object was detected in first field-of-view 120 of first imaging sensor 115. This also allows the mirrors and the opening at the nose of barcode readers 100A, 100B to be kept small. To further assist in making second field-of-view 140 of second imaging sensor 135 larger than first field-of-view 120 of first imaging sensor 115, a lens system 170 could also be positioned in a path of second field-of-view 140 of second imaging sensor 135 between second imaging sensor 135 and transflective mirror 155. Alternatively, lens system 170 could be a polarizing lens to filter the light received by second imaging sensor 135 into a desired polarization. If lens system 170 is a polarizing lens, the illumination from an illumination source (not shown) in barcode reader 100A, 100B would also be polarized, preferably in a direction that is perpendicular to the polarization of lens system 170, and the light received by second imaging sensor 135 would be polarized and the light received by first imaging sensor 115 would not be polarized.

In another example configuration, first imaging sensor 115 could be a monochrome imaging sensor, second imaging sensor 135 could be a color imaging sensor, and first field-of-view 120 and second field-of-view 140 could be the same size. This would allow barcode readers 100A, 100B to capture both monochromatic images, which are useful for capturing and decoding barcodes, and color images, which are useful for object/product identification, and can be used to eliminate shot noise and overlay the images on top of each other to identify an object/product and identify, capture, and decode any barcodes on the object/product. As above, in this configuration lens system 170 could also be positioned in a path of second field-of-view 140 of second imaging sensor 135 between second imaging sensor 135 and transflective mirror 155.

In other configurations, second imaging sensor 135 could be various types of sensors, such a thermal sensor, a three-dimensional camera, an ambient light sensor, etc., with first field-of-view 120 and second field-of-view 140 being the same size and the images captured by second imaging sensor 135 could overlaid and/or compared to the images captured by first imaging sensor 115 without any parallax between the images from each sensor. For example, second imaging sensor 135 can be a thermal sensor and first imaging sensor 115 can be a standard image sensor and the image from the thermal camera can be overlaid over the image from the standard image sensor to enhance facial recognition. This can ensure that what the standard image sensor is detecting is a real face (not a picture of a face) and determine if the individual in the image has an elevated temperature. Second imaging sensor 135 can also be a three-dimensional structured light sensor and first imaging sensor 115 a color image sensor and the image from the three-dimensional structured light sensor can be overlaid over the image from the color image sensor, which would make is easier to correlate three-dimensional data with proper color information.

In the example shown in FIG. 1, an second imaging axis 150 of second imaging sensor 135 is aligned parallel to an first imaging axis 130 of first imaging sensor 115 and a mirror 160 is positioned within housing 105 in the path of second field-of-view 140 of second imaging sensor 135 to reflect second field-of-view 140 of second imaging sensor 135 off of mirror 160 and towards transflective mirror 155. With second imaging axis 150 of second imaging sensor 135 aligned parallel to an first imaging axis 130 of first imaging sensor 115, first imaging sensor 115 and second imaging sensor 135 could both be mounted to a common printed circuit board 165.

Conversely, in the example shown in FIG. 2, second imaging sensor 135 is positioned perpendicular to first imaging sensor 115 so that second imaging axis 150 of second imaging sensor 135 is aligned perpendicular to first imaging axis 130 of first imaging sensor 115 and transflective mirror 155 is in a path of second field-of-view 140 of second imaging sensor 135, as well as in the path of first field-of-view 120 of first imaging sensor 115. In this example, an additional mirror is not required to direct the second field-of-view 140 of second imaging sensor 135 towards transflective mirror 155, however, first imaging sensor 115 and second imaging sensor 135 would most likely be mounted to two separate printed circuit boards within housing 105.

In addition, with barcode readers 100A, 100B configured such that first field-of-view 120 of first imaging sensor 115 is smaller than second field-of-view 140 of second imaging sensor (e.g., first field-of-view 120 provides a narrow angle field-of-view and second field-of-view 140 provides a wide angle field-of-view), or vice versa, barcode readers 100A, 100B can also be configured to determine the distance of a barcode or object from barcode readers 100A, 100B. Because first field-of-view 120 of first imaging sensor 115 and second field-of-view 140 of second imaging sensor 135 have different sizes as they travel from window 110, features of the barcode or object will be captured at different positions or pixels on first imaging sensor 115 and second imaging sensor 135. This shift in or distance between position/pixel for a common feature between the image captures of first imaging sensor 115 and second imaging sensor 135 can then be used to determine the distance of the barcode or object from barcode readers 100A, 100B. For example, as shown by line 305 in FIGS. 1-2, with transflective mirror 155 in the transmissive state a particular feature of a barcode 300 (e.g., the first number in the barcode, a corner of the barcode, the first line in the barcode, etc.) will be detected and captured by first imaging sensor 115 at a particular pixel, or set of pixels. Conversely, as shown by line 310 in FIGS. 1-2, with transflective mirror 155 in the reflective state the same feature of barcode 300 will be detected and captured by second imaging sensor 135 at a different pixel, or set of pixels. Knowing the size of first field-of-view 120 of first imaging sensor 115 out of window 110 with transflective mirror 155 in the transmissive state and second field-of-view 140 of second imaging sensor 135 with transflective mirror 155 in the reflective state, a processor (not shown) in communication with first imaging sensor 115 and second imaging sensor 135 can overlay/compare the image captures from first imaging sensor 115 and second imaging sensor 135 and, using well-known trigonometric calculations, use the distance between the location of the pixel(s) for the common feature in the captured images to determine the distance of barcode 300 from barcode readers 100A, 100B.

Figure 3:
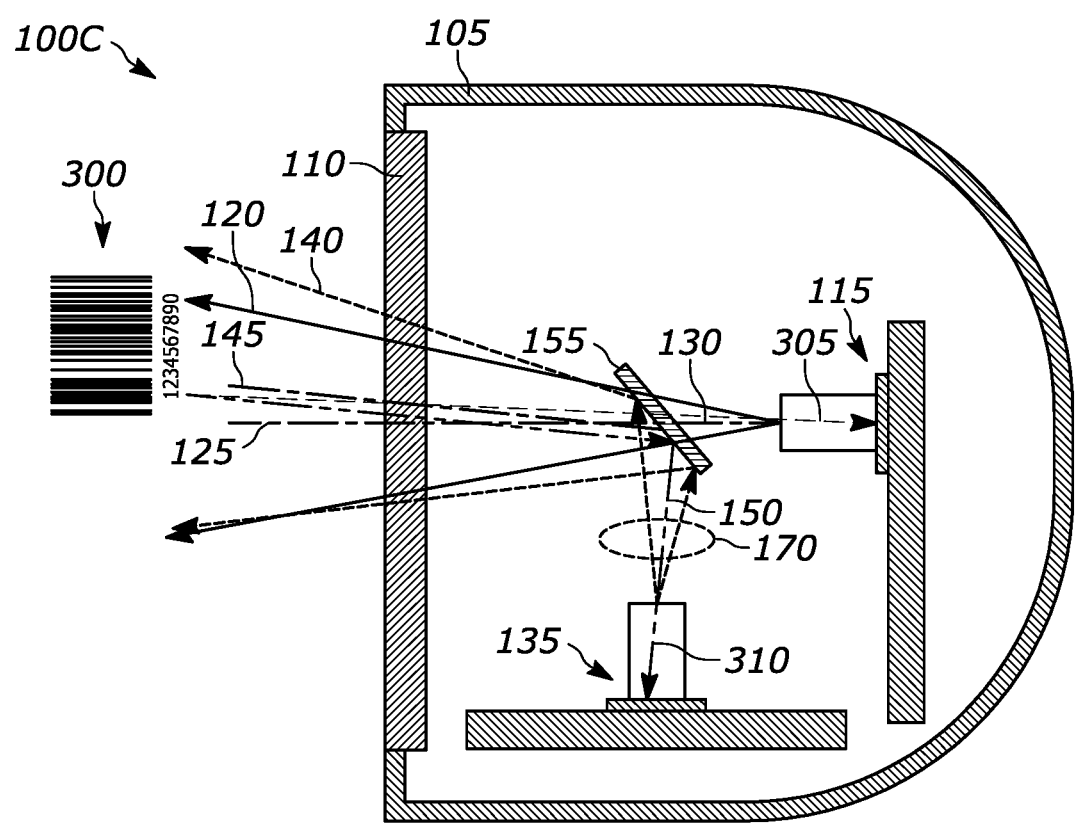
FIG. 3 illustrates a side cross-sectional schematic view of a an alternate configuration of the second example barcode reader of FIG. 2.

As shown in FIG. 3, the general configuration of barcode reader 100B can also be adapted to be able to determine the distance of a barcode or object from the barcode reader without first field-of-view 120 of first imaging sensor 115 and second field-of-view 140 of second imaging sensor 135 being coaxial. For example, as shown in FIG. 3, in barcode reader 100C second imaging sensor 135 is positioned non-parallel (possibly perpendicular) to first imaging sensor 115 so that second imaging axis 150 of second imaging sensor 135 is aligned non-parallel (possibly perpendicular) to first imaging axis 130 of first imaging sensor 115 and transflective mirror 155 is in a path of second field-of-view 140 of second imaging sensor 135, as well as in the path of first field-of-view 120 of first imaging sensor 115. However, in barcode reader 100C, the position of second imaging sensor 135 and the angle of transflective mirror 155 can be adjusted such that first central axis 125 of first field-of-view 120 of first imaging sensor 115 passing through transflective mirror 155 and out window 110 with transflective mirror 155 in the transmissive state is not coaxial and is angularly offset from second central axis 145 of first field-of-view 120 of second imaging sensor 135 reflected off of transflective mirror 155 and out window 110 with transflective mirror 155 in the reflective state. Based on the offset of first field-of-view 120 of first imaging sensor 115 out of window 110 with transflective mirror 155 in the transmissive state and second field-of-view 140 of second imaging sensor 135 out of window 110 with transflective mirror 155 in the reflective state, features of the barcode or object will be captured at different positions or pixels on first imaging sensor 115 and second imaging sensor 135. This shift in or distance between position/pixel for a common feature between the image captures of first imaging sensor 115 and second imaging sensor 135 can then be used to determine the distance of the barcode or object from barcode reader 100C. For example, as shown by line 305 in FIG. 3, with transflective mirror 155 in the transmissive state a particular feature of a barcode 300 (e.g., the first number in the barcode, a corner of the barcode, the first line in the barcode, etc.) will be detected and captured by first imaging sensor 115 at a particular pixel, or set of pixels. Conversely, as shown by line 310 in FIG. 3, with transflective mirror 155 in the reflective state the same feature of barcode 300 will be detected and captured by second imaging sensor 135 at a different pixel, or set of pixels. Knowing the size and direction of the central axis of first field-of-view 120 of first imaging sensor 115 out of window 110 with transflective mirror 155 in the transmissive state and second field-of-view 140 of second imaging sensor 135 with transflective mirror 155 in the reflective state, a processor (not shown) in communication with first imaging sensor 115 and second imaging sensor 135 can overlay/compare the image captures from first imaging sensor 115 and second imaging sensor 135 and, using well-known trigonometric calculations, use the distance between the location of the pixel(s) for the common feature in the captured images to determine the distance of barcode 300 from barcode reader 100C.

Figure 4:
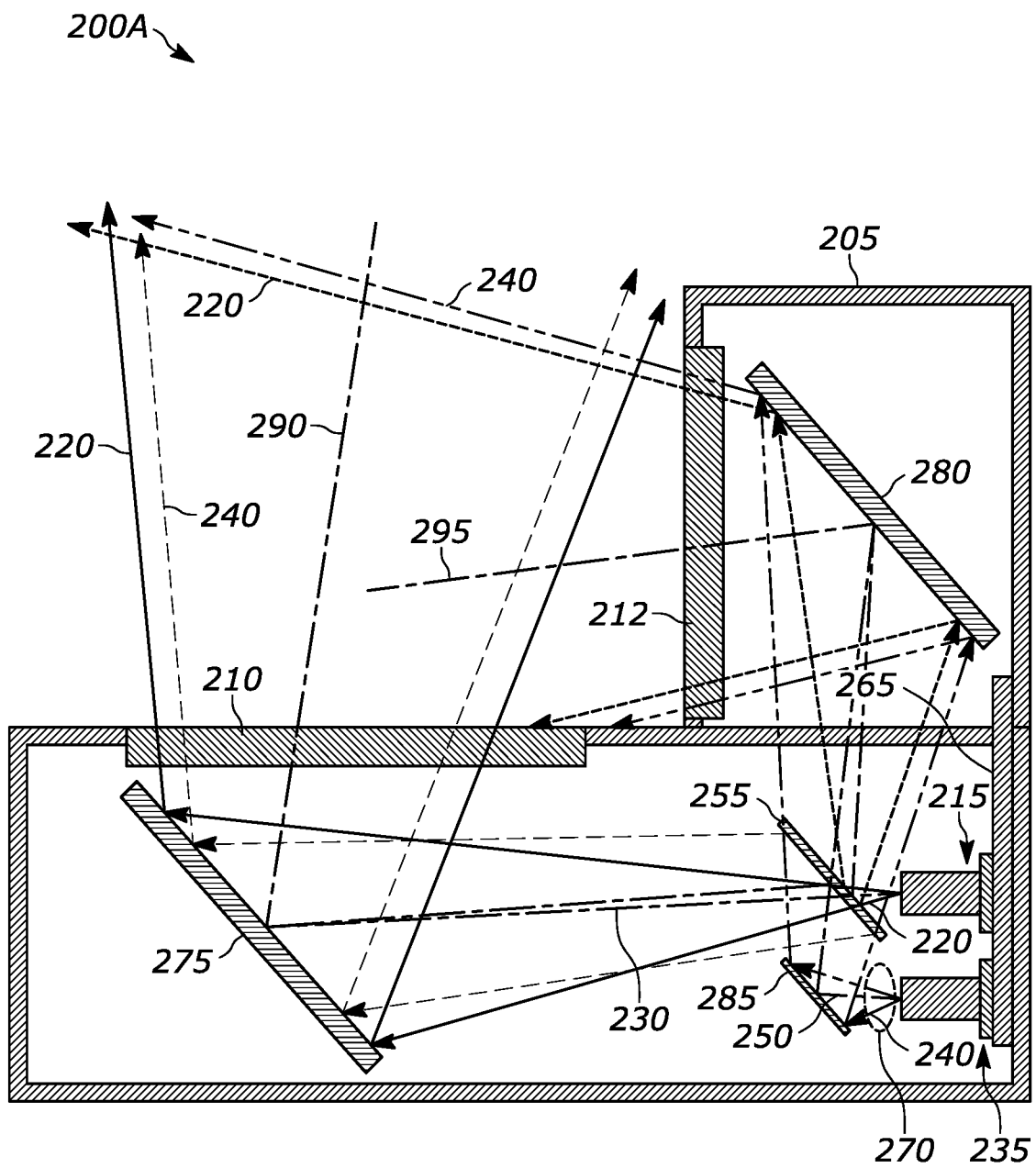
FIG. 4 illustrates a side cross-sectional schematic view of a first example bioptic barcode reader having a transflective mirror and two imaging sensors with parallel imaging axes.
Figure 5:
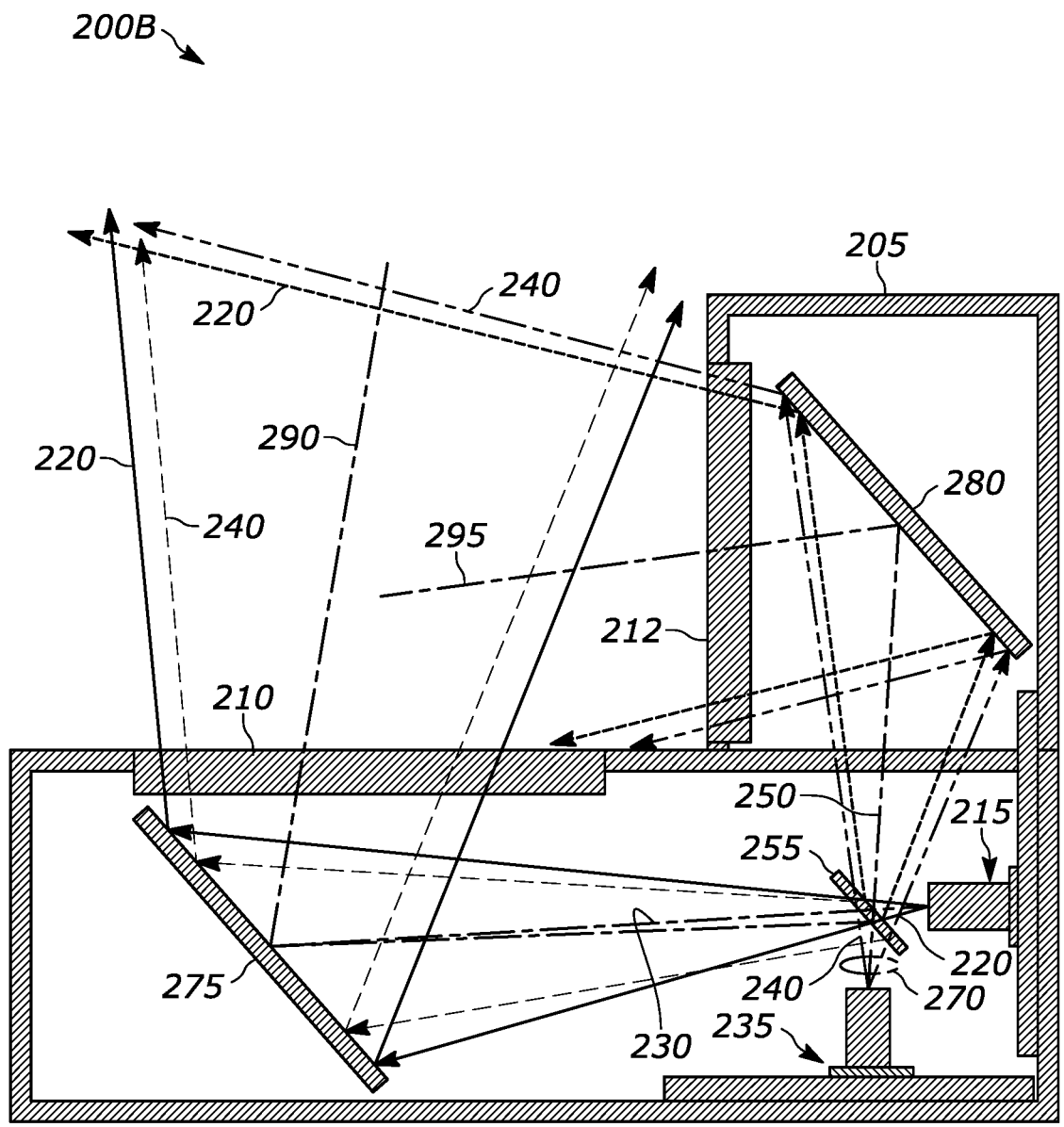
FIG. 5 illustrates a side cross-sectional schematic view of a second example bioptic barcode reader having a transflective mirror and two imaging sensors with perpendicular imaging axes.

Referring to FIGS. 4-5, example bioptic barcode readers 200A, 200B are shown that use a transflective mirror to direct the fields-of-view from two different imaging sensors out a window along the same central axis so there is no parallax. The transflective mirror can also be used to direct the entire field-of-view of each imaging sensor out of both the horizontal and upright window of the bioptic barcode reader. In the examples shown, bioptic barcode readers 200A, 200B include a housing 205 with a horizontal window 210 and an upright window 212 positioned within housing 205, first imaging sensor 215 and second imaging sensor 235 positioned within housing 205, a transflective mirror 255, such as the e-TransFlector™ from Kent Optronics, positioned within housing 205 and in a path of the first field-of-view 220 of first imaging sensor 215, and first mirror 275 and second mirror 280 positioned within housing 205. First imaging sensor 215 and second imaging sensor 235 can include a cylinder and/or a lens system to assist in directing first field-of-view 220 and second field-of-view 240, if desired. Transflective mirror 255 can be switched between a transmissive state, in which a majority of light is allowed to pass through transflective mirror 255, and a reflective state, in which a majority of light is reflected off of transflective mirror 255. With transflective mirror 255 in the transmissive state, transflective mirror 255 allows second field-of-view 240 of second imaging sensor 235 to pass through transflective mirror 255 and reflect off of second mirror 280 and out upright window 212 along a second central axis 295. In addition, although not required, first field-of-view 220 of first imaging sensor 215 can also pass through transflective mirror 255 and reflect off of first mirror 275 and out horizontal window 210 along a first central axis 290 with transflective mirror 255 in the transmissive state. With transflective mirror 255 in the reflective state, transflective mirror 255 reflects first field-of-view 220 of first imaging sensor 215 towards second mirror 280 and first field-of-view 220 is reflected off of second mirror 280 and out of upright window 212 along second central axis 295. In addition, although not required, second field-of-view 240 of second imaging sensor 235 can also be reflected off of transflective mirror 255 towards first mirror 275 and off of first mirror 275 and out horizontal window 210 along first central axis 290 with transflective mirror 255 in the reflective state. Optionally, transflective mirror 255 could also be switched to a transflective state, in which transflective mirror 255 is partially reflective and partially transmissive, and first field-of-view 220 of first imaging sensor 215 can pass through transflective mirror 255 and reflect off of first mirror 275 and out horizontal window 210 along first central axis 290 and be reflected off of transflective mirror 255 towards second mirror 280 and off of second mirror 280 and out upright window 212 along second central axis 295 and second field-of-view 240 of second imaging sensor 235 can pass through transflective mirror 255 and reflect off of second mirror 280 and out upright window 212 along second central axis 295 and be reflected off of transflective mirror 255 towards first mirror 275 and off of first mirror 275 and out horizontal window 210 along first central axis 290.

In one possible configuration, the switching of transflective mirror 255 between the reflective and transmissive states can be synchronized with the frame rates of first imaging sensor 215 and second imaging sensor 235 such that transflective mirror 255 changes states between the reflective and transmissive states between each image capture of first imaging sensor 215 and second imaging sensor. Therefore, with imaging sensors having a frame rate of 120 frames-per-second, there would still be 60 frames-per-second captured through horizontal window 210 and 60 frames-per-second captured through upright window 212. Alternatively, transflective mirror 255 can be switched between the transmissive and reflective states at any rate and time desired. For example, in a second possible configuration, the switching of transflective mirror 255 between the reflective and transmissive states can be synchronized with the frame rate of first imaging sensor 215 and second imaging sensor 235 such that transflective mirror 255 alternates and changes state between the reflective and transmissive states after two image captures of first imaging sensor 215 and second imaging sensor 235 and then changes back between the reflective and transmissive states after one image capture of first imaging sensor 215 and second imaging sensor 235. Alternatively, in a third possible configuration, the switching of transflective mirror 255 between the reflective and transmissive states can be based on information gathered from prior image captures by first imaging sensor 215 and second imaging sensor 235. For example, prior image captures by first imaging sensor 215 and second imaging sensor 235 could show that there are more, or a predetermined number of, successful decodes of barcodes with transflective mirror 255 in either the reflective or transmissive state and the switching of transflective mirror 255 between states can be set so that there are more image capture attempts with transflective mirror 255 in the state with the greater or predetermined number of successful image captures. In addition, prior image captures by first imaging sensor 215 could identify that a particular item is being presented to the bioptic barcode reader and the switching of transflective mirror 255 between states can be set so that there are more images capture attempts with transflective mirror 255 in the state where the barcode is expected to be found.

By switching the view of first imaging sensor 115 and second imaging sensor 135 between horizontal window 210 and upright window 212 and directing first field-of-view 220 of first imaging sensor 215 and second field-of-view 240 of second imaging sensor 235 out of horizontal window 210 and upright window 212 along the same axes, images can be captured by first imaging sensor 215 and second imaging sensor 235 through both windows without parallax between the images, which can be useful for various applications.

For example, in one configuration, first field-of-view 220 of first imaging sensor 215 can provide a narrow angle field-of-view and second field-of-view 240 of second imaging sensor 235 can provide a wide angle field-of-view, or vice versa, which would allow barcode readers 200A, 200B to read barcodes that are located both close to a far away from horizontal window 210 and upright window 212 and enable the use of the same illumination system for both first imaging sensor 115 and second imaging sensor 135 out of each window. In another configuration, second imaging sensor 235 could be a wake up sensor and second field-of-view 240 of second imaging sensor 235 that passes out of horizontal window 210 and upright window 212 could be the same size or larger than first field-of-view 220 of first imaging sensor 215 that passes out of horizontal window 210 and upright window 212. In the configuration with second field-of-view 240 being larger than first field-of-view 220, the larger second field-of-view 240 of second imaging sensor 235 (the wake up sensor) would allow second imaging sensor 235 to detect an object and activate the system before the object passes through first field-of-view 220 of first imaging sensor 215. This gives first imaging sensor 215 more time to capture images and potential barcodes on the object, and more image captures, than if the system were not activated until the object was detected in first field-of-view 220 of first imaging sensor 215. This also allows the mirrors and the windows to be kept small. To further assist in making second field-of-view 240 of second imaging sensor 235 larger than first field-of-view 220 of first imaging sensor 215, a lens 270 could also be positioned in a path of second field-of-view 240 of second imaging sensor 235 between second imaging sensor 235 and transflective mirror 255. Alternatively, lens 270 could be a polarizing lens to filter the light received by second imaging sensor 235 into a desired polarization. If lens 270 is a polarizing lens, the illumination directed out of horizontal window 210 from a horizontal illumination source (not shown) and out of upright window 212 from a vertical illumination source (not shown) would also be polarized, preferably in a direction that is perpendicular to the polarization of lens 270, and the light received by second imaging sensor 235 would be polarized and the light received by first imaging sensor 215 would not be polarized.

In another example configuration, first imaging sensor 215 could be a monochrome imaging sensor and second imaging sensor 235 could be a color imaging sensor and first field-of-view 220 and second field-of-view 240 could be the same size. This would allow barcode readers 200A, 200B to capture both monochromatic images, which are useful for capturing and decoding barcodes, and color images, which are useful for object/product identification, and can be used to eliminate shot noise and overlay the images on top of each other to identify an object/product and identify, capture, and decode any barcodes on the object/product. As above, in this configuration lens 270 could also be positioned in a path of second field-of-view 240 of second imaging sensor 235 between second imaging sensor 235 and transflective mirror 255.

In other configurations, second imaging sensor 235 could be various types of sensors, such a thermal sensor, a three-dimensional camera, an ambient light sensor, etc., first field-of-view 220 and second field-of-view 240 could be the same size, and the images captured by second imaging sensor 235 could overlaid and/or compared to the images captured by first imaging sensor 215 without any parallax between the images from each sensor. For example, second imaging sensor 135 can be a thermal sensor and first imaging sensor 115 can be a standard image sensor and the image from the thermal camera can be overlaid over the image from the standard image sensor to enhance facial recognition. This can ensure that what the standard image sensor is detecting is a real face (not a picture of a face) and determine if the individual in the image has an elevated temperature. Second imaging sensor 135 can also be a three-dimensional structured light sensor and first imaging sensor 115 a color image sensor and the image from the three-dimensional structured light sensor can be overlaid over the image from the color image sensor, which would make is easier to correlate three-dimensional data with proper color information.

In the example shown in FIG. 4, an second imaging axis 250 of second imaging sensor 235 is aligned parallel to an first imaging axis 230 of first imaging sensor 215 and a third mirror 285 is positioned within housing 205 in the path of second field-of-view 240 of second imaging sensor 235 to reflect second field-of-view 240 of second imaging sensor 235 off of third mirror 285 and towards transflective mirror 255. With second imaging axis 250 of second imaging sensor 235 aligned parallel to first imaging axis 230 of first imaging sensor 215, first imaging sensor 215 and second imaging sensor 235 could both be mounted to a common printed circuit board 265.

Conversely, in the example shown in FIG. 5, second imaging sensor 235 is positioned perpendicular to first imaging sensor 215 so that second imaging axis 250 of second imaging sensor 235 is aligned perpendicular to first imaging axis 230 of first imaging sensor 215 and transflective mirror 255 is in a path of second field-of-view 240 of second imaging sensor 235, as well as in the path of first field-of-view 220 of first imaging sensor 215. In this example, an additional mirror is not required to direct the second field-of-view 240 of second imaging sensor 235 towards transflective mirror 255, however, first imaging sensor 215 and second imaging sensor 235 would most likely be mounted to two separate printed circuit boards within housing 205.

Figure 6:
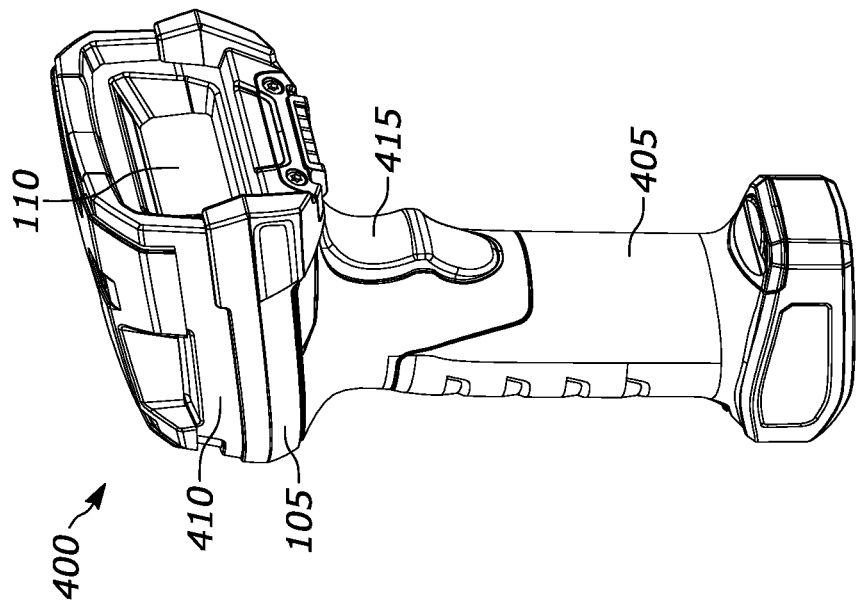
FIG. 6. illustrates a perspective view of an example barcode reader.

Referring to FIG. 6, an example barcode reader 400 is shown, which can be used to implement any of the examples shown and described herein, such as barcode readers 100A, 100B, and 100C. It will be understood that although a particular embodiment of barcode reader 400 is disclosed, this disclosure is applicable to a variety of barcode readers, including, but not limited to, gun-type handheld readers, mobile computer-type readers, presentation readers, etc. As illustrated in FIG. 6, exemplary barcode reader 400 has housing 105 with a handle portion 405, also referred to as a handle 405, and a head portion 410, also referred to as a scanning head 410. Head portion 410 includes window 110, and is configured to be positioned on the top of handle portion 405. Handle portion 405 is configured to be gripped by a user (not shown) and includes a trigger 415 for activation by the user. Optionally included in an example is also a base (not shown), also referred to as a base portion, that may be attached to handle portion 405 opposite head portion 410, and is configured to stand on a surface and support housing 105 in a generally upright position. Barcode reader 400 can be used in a hands-free mode as a stationary workstation when it is placed on a countertop or other workstation surface. Barcode reader 400 can also be used in a handheld mode when it is picked up off the countertop or base station, and held in the user's hand. In the hands-free mode, products can be slid, swiped past, or presented to the window 110 for barcode reader 400 to initiate barcode reading operations. In the handheld mode, barcode reader 400 can be moved towards a barcode on a product, and trigger 415 can be manually depressed to initiate imaging of the barcode. Other implementations may provide only handheld or only hands-free configurations. In the example of FIG. 6, barcode reader 400 is ergonomically configured for a user's hand as a gun-shaped housing, though other configurations may be utilized as understood by those of ordinary skill in the art. As shown, handle portion 405 extends below and rearwardly away from head portion 410 along a centroidal axis obliquely angled relative to first central axis 125 of first field-of-view 120 of first imaging sensor 115 within head portion 410.

Figure 7:
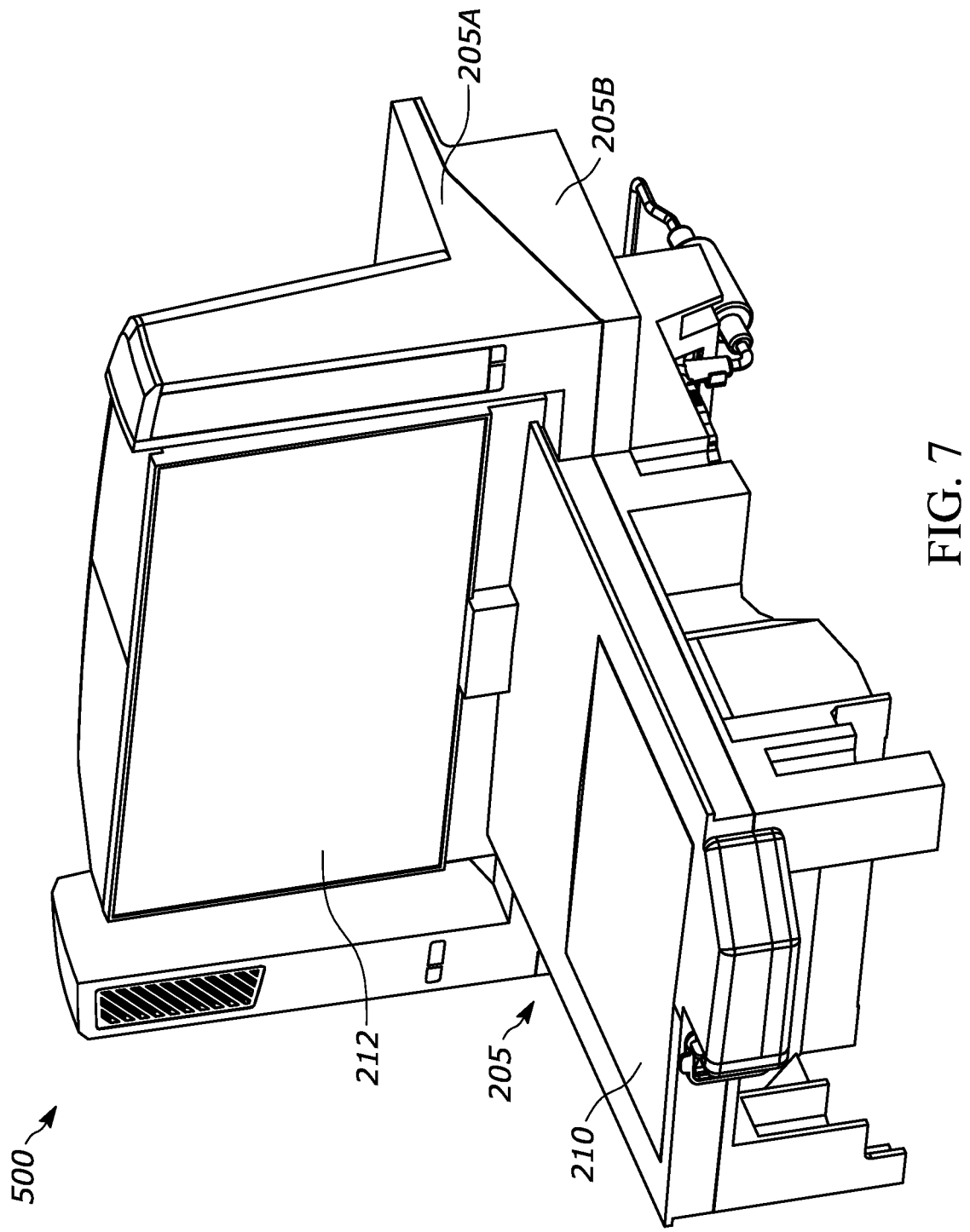
FIG. 7 illustrates a perspective view of an example bioptic barcode reader.

Referring to FIG. 7, an example bioptic barcode reader 500 is shown, which can be used to implement any of the examples shown and described herein, such as bioptic barcode readers 200A and 200B. Bioptic barcode reader 500 can be installed in a workstation, a counter, or other workspace to allow products or items to be moved through a scanning region of bioptic barcode reader 500 to read and decode barcodes on the products or items presented in a scanning region of bioptic barcode reader 500. As illustrated in FIG. 7, bioptic barcode reader 500 generally includes housing 205, which in the example shown includes an upper housing portion 205A and a lower housing portion 205B secured directly to upper housing portion 205A, for example with threaded members. Alternatively, housing 205 can also include one or more intermediate housing portions positioned between upper housing portion 205A and lower housing portion 205B. Horizontal window 210 is positioned in housing 205 and, in the example shown, is positioned in a horizontally extending portion of upper housing portion 205A. Upright window 212 is also positioned in housing 205 and, in the example shown, is positioned in a vertically extending or tower portion of upper housing portion 205A.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader, comprising:
a housing and a window positioned in the housing;
a first imaging sensor positioned within the housing;
a second imaging sensor positioned within the housing; and
a transflective mirror positioned within the housing and in a path of a first field-of-view of the first imaging sensor; wherein
the first field-of-view of the first imaging sensor passes through the transflective mirror and out the window with the transflective mirror in a transmissive state; and
a second field-of-view of the second imaging sensor is reflected off of the transflective mirror and out the window with the transflective mirror in a reflective state,
wherein the first field-of-view of the first imaging sensor passes through the transflective mirror and out the window along a first central axis of the first field-of-view of the first imaging sensor with the transflective mirror in a transmissive state and the second field-of-view of the second imaging sensor is reflected off of the transflective mirror and out the window along a second central axis of the second field-of-view of the second imaging sensor that is coaxial with the first central axis of the first field-of-view of the first imaging sensor with the transflective mirror in a reflective state.

2. The barcode reader of claim 1, comprising a mirror positioned within the housing and in the path of the second field-of-view of the second imaging sensor, wherein:
a second imaging axis of the second imaging sensor is aligned parallel to a first imaging axis of the first imaging sensor; and
the second field-of-view of the second imaging sensor is reflected off of the mirror and towards the transflective mirror.

3. The barcode reader of claim 2, wherein the first imaging sensor and the second imaging sensor are both mounted to a common printed circuit board.

4. The barcode reader of claim 1, wherein the first field-of-view of the first imaging sensor that passes out the window provides a narrow angle field-of-view and the second field-of-view of the second imaging sensor that passes out the window provides a wide angle field-of-view.

5. The barcode reader of claim 1, wherein the second imaging sensor is a wake up sensor.

6. The barcode reader of claim 5, wherein the second field-of-view of the second imaging sensor that passes out the window is larger than the first field-of-view of the first imaging sensor that passes out the window.

7. The barcode reader of claim 5, comprising a lens system positioned in a path of the second field-of-view of the second imaging sensor between the second imaging sensor and the transflective mirror.

8. The barcode reader of claim 1, wherein the first imaging sensor is a monochrome imaging sensor and the second imaging sensor is a color imaging sensor.

9. The barcode reader of claim 8, comprising a lens system positioned in a path of the second field-of-view of the second imaging sensor between the second imaging sensor and the transflective mirror.

10. The barcode reader of claim 1, wherein the second imaging sensor is one of a thermal sensor, a three-dimensional camera, or an ambient light sensor.

11. A bioptic barcode reader, comprising:
a housing comprising a horizontal window and an upright window;
a first imaging sensor positioned within the housing;
a second imaging sensor positioned within the housing;
a transflective mirror positioned within the housing and in a path of a first field-of-view of the first imaging sensor;
a first mirror positioned within the housing; and
a second mirror positioned within the housing; wherein
a first field-of-view of the first imaging sensor is reflected off of the transflective mirror and off of the second mirror and out the upright window along a second central axis with the transflective mirror in a reflective state; and
a second field-of-view of the second imaging sensor passes through the transflective mirror and reflects off of the second mirror and out the upright window along the second central axis with the transflective mirror in a transmissive state,
wherein:
the first field-of-view of the first imaging sensor passes through the transflective mirror and reflects off of the first mirror and out the horizontal window along a first central axis with the transflective mirror in the transmissive state; and
the second field-of-view of the second imaging sensor is reflected off of the transflective mirror and off of the first mirror and out the horizontal window along the first central axis with the transflective mirror in the reflective state.

12. The bioptic barcode reader of claim 11, wherein the first field-of-view of the first imaging sensor passes through the transflective mirror and reflects off of the first mirror and out the horizontal window along the first central axis and is reflected off of the transflective mirror and off of the second mirror and out the upright window along the second central axis and the second field-of-view of the second imaging sensor passes through the transflective mirror and reflects off of the second mirror and out the upright window along the second central axis and is reflected off of the transflective mirror and off of the first mirror and out the horizontal window along the first central axis with the transflective mirror in a transflective state.

13. The bioptic barcode reader of claim 11, wherein a second imaging axis of the second imaging sensor is aligned perpendicular to a first imaging axis of the first imaging sensor and the transflective mirror is positioned in a path of the second field-of-view of the second imaging sensor.

14. The bioptic barcode reader of claim 11, comprising a third mirror positioned within the housing and in the path of the second field-of-view of the second imaging sensor, wherein:
a second imaging axis of the second imaging sensor is aligned parallel to a first imaging axis of the first imaging sensor; and
the second field-of-view of the second imaging sensor is reflected off of the third mirror and towards the transflective mirror.

15. The bioptic barcode reader of claim 14, wherein the first imaging sensor and the second imaging sensor are both mounted to a common printed circuit board.

16. The bioptic barcode reader of claim 11, wherein the first field-of-view of the first imaging sensor is a narrow angle field-of-view and the second field-of-view of the second imaging sensor is a wide angle field-of-view.

17. The bioptic barcode reader of claim 11, wherein the second imaging sensor is one of a wake up sensor, a color imaging sensor, a thermal sensor, a three-dimensional camera, or an ambient light sensor.

18. The bioptic barcode reader of claim 17, comprising a lens positioned in a path of the second field-of-view of the second imaging sensor between the second imaging sensor and the transflective mirror.

* * * * *